No. 744,090. PATENTED NOV. 17, 1903.
R. J. C. MITCHELL.
BLANKET FOR PRINTING OR OTHER MACHINES.
APPLICATION FILED APR. 25, 1902.
NO MODEL.
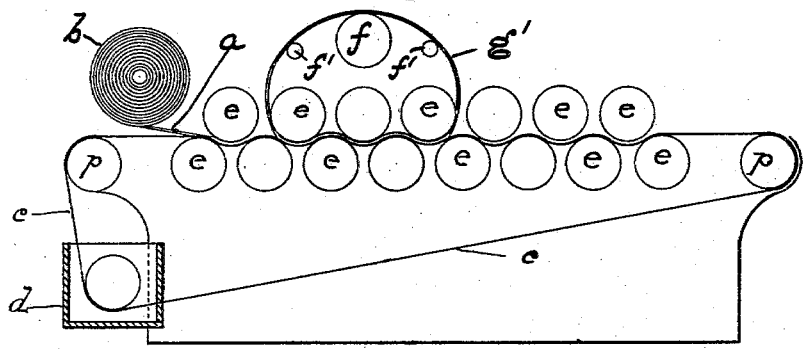
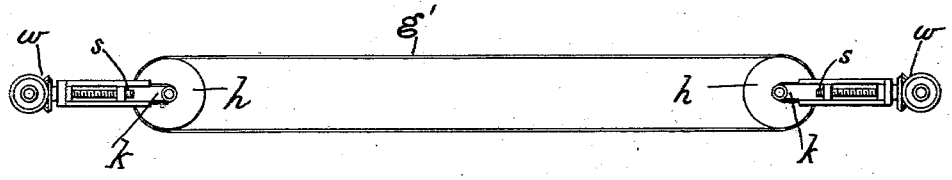
WITNESSES
F. W. Wright
Walter Abbe
INVENTOR
Robert J. C. Mitchell
BY
Howson and Howson
ATTORNEYS No. 744,090. Patented November 17, 1903.

UNITED STATES PATENT OFFICE.

ROBERT J. C. MITCHELL, OF WATERFOOT, NEAR MANCHESTER, ENGLAND.

BLANKET FOR PRINTING OR OTHER MACHINES.

SPECIFICATION forming part of Letters Patent No. 744,090, dated November 17, 1903.

Application filed April 25, 1902. Serial No. 104,724. (No model.)

*To all whom it may concern:*

Be it known that I, ROBERT JOHN CHADWICK MITCHELL, a subject of the King of Great Britain, residing at Albert Works, Waterfoot, near Manchester, in the county of Lancaster, England, have invented a new and useful Improved Blanket for Printing or other Machines, of which the following is a specification.

This invention relates to an improved printing-blanket without either warp or weft for use principally in machines for printing calicoes, the same blanket being applicable also for paper-making, dyeing, scouring, bleaching, and other purposes.

Felt blankets with a woven foundation, such as hitherto made, can only be employed for a limited period, as the felt surface is rapidly worn off, exposing the warp and weft, which will then leave a mark or impression on the material passing over it. Therefore only about one-third of the thickness of the blanket can be used and the rest is wasted. My invention is designed to remedy this defect; and it consists of an endless seamless solid felt blanket without either warp or weft, which will neither stretch in length nor become reduced in width by use in the printing or other machines, and of which fully two-thirds of the blanket can be used (or until it has been greatly reduced in the thickness) without causing any defect in the design that is being printed or transferring any mark or impression to the material in contact therewith.

My improved blanket may be produced by different means; but for the better understanding of my invention I have shown in the accompanying drawings appliances which may be used for the purpose, Figures 1 and 2 being diagrammatic views of two devices to be used in succession.

In Fig. 1, $c$ indicates an endless cloth or apron which runs over rollers $p\,p$ and through a water-trough $d$ and between a series of rollers $e$. A layer of sliver $a$ is fed from the roller $b$ to the surface of the endless traveling cloth $c$ and thence with the latter through as many of the rollers $e$ as desirable. The sliver layer at a suitable point leaves the cloth $c$ and is carried up and over rollers $f$ and $f'$ above the rollers $e\,e$ and fed again into the incoming layer of sliver from $b$. In this way an endless "bat" $g'$ of slivers is formed from the repeated superposing of the layers of sliver. These layers are allowed to accumulate until the endless bat has attained the thickness required. This endless bat so formed is then hardened, fulled, and milled in the usual manner, but is made considerably wider and milled shorter than it is required to be when finished. I then take this intermediate product—an endless and seamless hardened, fulled, and milled felt blanket—and submit it, while in its wet condition, to a stretching process, as by means of the appliance shown in Fig. 2, where $g'$ represents the wet blanket hung over revolving rollers $h$. The rollers are mounted in blocks $k$, so as to be movable toward or away from each other. A screw $s$ and bevel-wheels $w$ are shown as a means for accomplishing this motion of the rollers by means of which the endless blanket may be stretched until brought to the required length. As the seamless blanket is by these means stretched in length, it is proportionately reduced in width, and I then dry it in this stretched condition. By this method of manufacture and treatment I produce an endless seamless solid felt blanket, without a woven foundation, for printing and other machines, and which will neither stretch nor shrink when in use on the printing or other machine and which can be worn much longer than blankets as hitherto made.

I claim as my invention—

As a new article of manufacture, the herein-described blanket for printing-machines, &c., said blanket being an endless seamless blanket of solid felt without warp or weft and which will neither shrink nor stretch when used in a printing-machine or the like, substantially as set forth.

In testimony whereof I have signed my name to this specification in the presence of two subscribing witnesses.

ROBERT J. C. MITCHELL.

Witnesses:
THOS. PRESCOTT,
J. W. HUGHES.